(12) United States Patent
Hayashi et al.

(10) Patent No.: US 9,708,510 B2
(45) Date of Patent: Jul. 18, 2017

(54) PRESSURE-SENSITIVE ADHESIVE COMPOSITION, PRESSURE-SENSITIVE ADHESIVE SHEET, AND MOISTURE-PERMEABLE WATERPROOF PRESSURE-SENSITIVE ADHESIVE SHEET

(71) Applicant: NITTO DENKO CORPORATION, Osaka (JP)

(72) Inventors: Youhei Hayashi, Osaka (JP); Hiroki Fujii, Osaka (JP); Tetsuro Taga, Osaka (JP); Shinichiro Kose, Osaka (JP); Yoshiaki Mitsuoka, Osaka (JP); Akihiro Kiriyama, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/380,872

(22) PCT Filed: Mar. 5, 2013

(86) PCT No.: PCT/JP2013/056016
§ 371 (c)(1),
(2) Date: Aug. 25, 2014

(87) PCT Pub. No.: WO2013/137072
PCT Pub. Date: Sep. 19, 2013

(65) Prior Publication Data
US 2015/0024196 A1 Jan. 22, 2015

(30) Foreign Application Priority Data
Mar. 13, 2012 (JP) .................................. 2012-055703

(51) Int. Cl.
*C09J 7/02* (2006.01)
*C09J 123/22* (2006.01)
(Continued)

(52) U.S. Cl.
CPC ........... *C09J 7/0214* (2013.01); *C09J 123/22* (2013.01); *C08L 2205/02* (2013.01);
(Continued)

(58) Field of Classification Search
None
See application file for complete search history.

(56) References Cited

U.S. PATENT DOCUMENTS 4,393,150 A 7/1983 Kresner
6,274,235 B1 8/2001 Ichimura et al.
(Continued)

FOREIGN PATENT DOCUMENTS

CN 1536047 A 10/2004
CN 101805569 A 8/2010
(Continued)

OTHER PUBLICATIONS

Barlow, Fred W., Rubber Compounding: Principles, Materials, and Techniques, 1993, CRC Press, pp. 169-175.*
(Continued)

*Primary Examiner* — Elaine M Vazquez
(74) *Attorney, Agent, or Firm* — Edwards Neils LLC; Jean C. Edwards

(57) ABSTRACT

A pressure-sensitive adhesive composition includes 100 parts by mass of a rubber component containing 40 to 93 mass % of a butyl rubber and 7 to 60 mass % of a polyisobutylene and 82 to 128 parts by mass of a softener having a kinetic viscosity at 40° C. of 100 to 9,000 mm$^2$/s.

8 Claims, 3 Drawing Sheets

(51) Int. Cl.
*C08L 23/22* (2006.01)
*C09J 115/00* (2006.01)
*C09J 117/00* (2006.01)

(52) U.S. Cl.
CPC ............ *C09J 115/00* (2013.01); *C09J 117/00* (2013.01); *C09J 2415/00* (2013.01); *C09J 2417/00* (2013.01); *Y10T 428/1476* (2015.01); *Y10T 428/2835* (2015.01)

(56) References Cited

U.S. PATENT DOCUMENTS

| | | | |
|---|---|---|---|
| 2004/0176524 A1* | 9/2004 | Ikuji | C08K 5/14 524/505 |
| 2004/0241434 A1* | 12/2004 | Yamaguchi et al. | 428/354 |
| 2005/0187355 A1* | 8/2005 | Tasaka | C08K 5/14 525/314 |
| 2006/0148927 A1 | 7/2006 | Hirose | |
| 2006/0165764 A1* | 7/2006 | Hanatani | A61K 9/7007 424/448 |
| 2011/0247674 A1* | 10/2011 | Fujii et al. | 136/244 |

FOREIGN PATENT DOCUMENTS

| | | |
|---|---|---|
| CN | 102676070 A | 9/2012 |
| JP | 50-086538 | 7/1975 |
| JP | 54-102019 A | 8/1979 |
| JP | 57-164137 A | 10/1982 |
| JP | 62-131081 A | 6/1987 |
| JP | 03-066742 A | 3/1991 |
| JP | 03-199281 A | 8/1991 |
| JP | 04-056736 U | 5/1992 |
| JP | 05-078634 A | 3/1993 |
| JP | 10-036597 A | 2/1998 |
| JP | 11-131031 A | 5/1999 |
| JP | 2003-041233 A | 2/2003 |
| JP | 2003-138227 A | 5/2003 |
| JP | 2006-241769 | 9/2006 |
| WO | WO 2004/092296 A1 | 10/2004 |

OTHER PUBLICATIONS

Standard Method for Conversion of Kinematic Viscosity to Saybolt Universal Viscosity or to Saybolt Furol Viscosity, ASTM D 2161-66, 1966, American National Standards Institute.*
DowPol Polybutene HV-15 Product Sheet.*
International Preliminary Report on Patentability issued by WIPO on Sep. 25, 2014 in connection with related Intl. Patent Appln. No. PCT/JP2013/056016.
International Search Report issued in PCT/JP2013/056016 on Jun. 11, 2013.
Written Opinion issued in PCT/JP2013/056016 on Jun. 11, 2013.
First Office Action issued by the State Intellectual Property Office (SIPO) of China on Aug. 4, 2015 in connection with Chinese Patent Application No. 201380013979.x.
Second Office Action issued by the State Intellectual Property Office (SIPO) of China on Apr. 14, 2016 in connection with Chinese Patent Application No. 201380013979.X.

* cited by examiner

FIG. 1
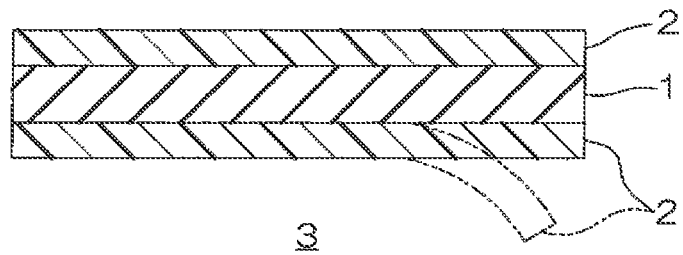
FIG. 2
FIG. 2(a)
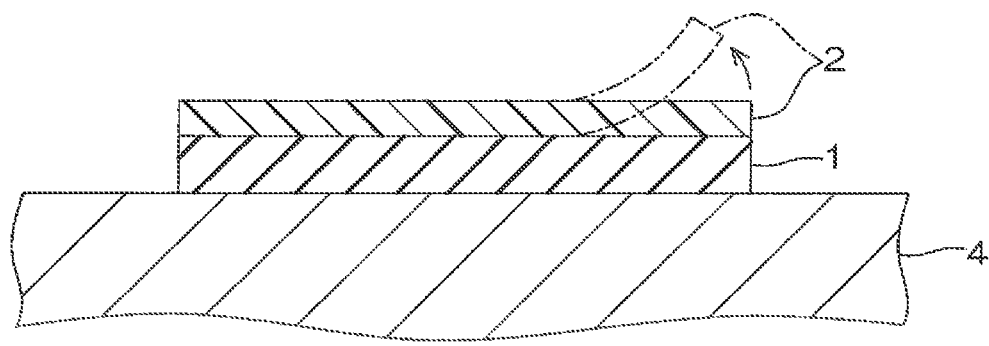
FIG. 2(b)
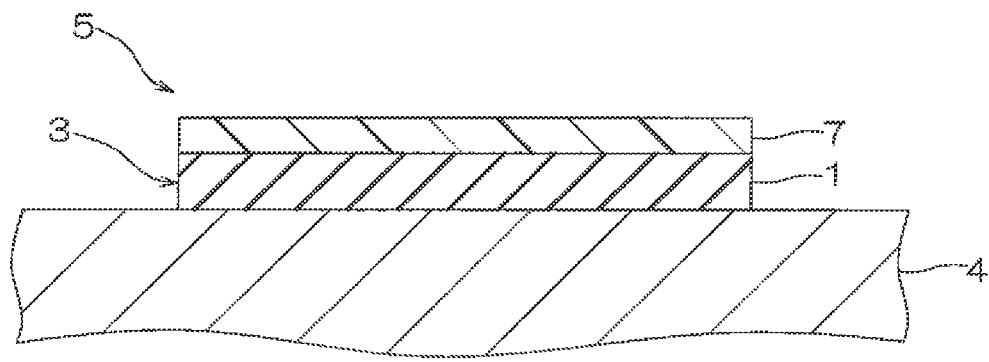

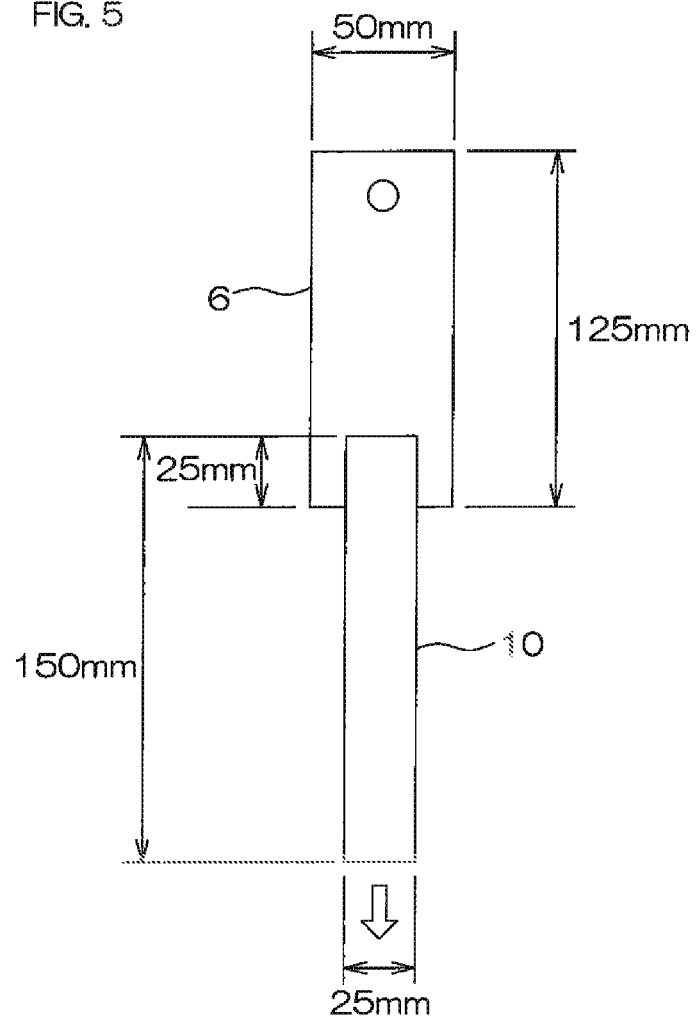

PRESSURE-SENSITIVE ADHESIVE COMPOSITION, PRESSURE-SENSITIVE ADHESIVE SHEET, AND MOISTURE-PERMEABLE WATERPROOF PRESSURE-SENSITIVE ADHESIVE SHEET

CROSS-REFERENCE TO RELATED APPLICATIONS

The present invention is a 35 U.S.C. 371 National Stage Entry of PCT/JP2013/056016, filed Mar. 5, 2013, which claims priority from Japanese Patent Application No. 2012-055703, filed on Mar. 13, 2012, the contents of both of which are herein incorporated by reference in their entirety.

TECHNICAL FIELD

The present invention relates to a pressure-sensitive adhesive composition, a pressure-sensitive adhesive sheet, and a moisture-permeable waterproof pressure-sensitive adhesive sheet, to be specific, to a pressure-sensitive adhesive composition, a pressure-sensitive adhesive sheet including a pressure-sensitive adhesive layer formed from the pressure-sensitive adhesive composition, and a moisture-permeable waterproof pressure-sensitive adhesive sheet including the pressure-sensitive adhesive sheet.

BACKGROUND ART

It has been conventionally known that a pressure-sensitive adhesive sheet including a pressure-sensitive adhesive layer that is formed from a pressure-sensitive adhesive composition is attached (applied) to an object to be attached (applied) such as a wall or a roof material and then, a moisture-permeable waterproof sheet is attached thereto from the upper side thereof.

As the pressure-sensitive adhesive composition that forms the pressure-sensitive adhesive layer in the pressure-sensitive adhesive sheet, for example, a pressure-sensitive adhesive composition that is prepared by kneading 1000 g of a reclaimed butyl rubber and 500 g of a polybutene having a kinetic viscosity at 40° C. of 26000 mm²/s has been proposed (ref: for example, the following Patent Document 1).

PRIOR ART DOCUMENT

Patent Document

Patent Document 1: Japanese Unexamined Patent Publication No. 2003-41233

SUMMARY OF THE INVENTION

Problems to be Solved by the Invention

When the moisture-permeable pressure-sensitive adhesive sheet is used outside such as a construction and engineering work, the pressure-sensitive adhesive composition is also exposed to a high temperature atmosphere in summer and a low temperature atmosphere in winter, so that the pressure-sensitive adhesive composition is required to have excellent pressure-sensitive adhesive properties in a wide temperature range from a low temperature to a high temperature. The pressure-sensitive adhesive composition described in the above-described Patent Document 1, however, may not be capable of sufficiently satisfying the above-described requirement, among all, excellent pressure-sensitive adhesive properties at a low temperature (about −10° C.).

Furthermore, the pressure-sensitive adhesive composition is also required to have excellent holding properties with respect to an object to be applied at a high temperature.

It is an object of the present invention to provide a pressure-sensitive adhesive composition having excellent pressure-sensitive adhesive properties in a wide temperature range and excellent holding properties with respect to an object to be applied at a high temperature, a pressure-sensitive adhesive sheet including a pressure-sensitive adhesive layer that is formed from the pressure-sensitive adhesive composition, and a moisture-permeable waterproof pressure-sensitive adhesive sheet including the pressure-sensitive adhesive sheet.

Solution to the Problems

A pressure-sensitive adhesive composition of the present invention includes 100 parts by mass of a rubber component containing 40 to 93 mass % of a butyl rubber and 7 to 60 mass % of a polyisobutylene and 82 to 128 parts by mass of a softener having a kinetic viscosity at 40° C. of 100 to 9000 mm²/s.

In the pressure-sensitive adhesive composition of the present invention, it is preferable that the softener has a pour point of −55 to −10° C.

In the pressure-sensitive adhesive composition of the present invention, it is preferable that the polyisobutylene has a viscosity average molecular weight of 500000 to 3000000.

In the pressure-sensitive adhesive composition of the present invention, it is preferable that the butyl rubber is a reclaimed butyl rubber.

In the pressure-sensitive adhesive composition of the present invention, it is preferable that the pressure-sensitive adhesive composition further contains a cross-linking agent.

A pressure-sensitive adhesive sheet of the present invention includes a pressure-sensitive adhesive layer formed from a pressure-sensitive adhesive composition containing 100 parts by mass of a rubber component containing 40 to 93 mass % of a butyl rubber and 7 to 60 mass % of a polyisobutylene and 82 to 128 parts by mass of a softener having a kinetic viscosity at 40° C. of 100 to 9000 mm²/s.

A moisture-permeable waterproof pressure-sensitive adhesive sheet of the present invention includes a moisture-permeable waterproof sheet and a pressure-sensitive adhesive sheet, wherein the pressures-ensitive adhesive sheet includes a pressure-sensitive adhesive layer formed from a pressure-sensitive adhesive composition containing 100 parts by mass of a rubber component containing 40 to 93 mass % of a butyl rubber and 7 to 60 mass % of a polyisobutylene and 82 to 128 parts by mass of a softener having a kinetic viscosity at 40° C. of 100 to 9000 mm²/s.

Effect of the Invention

The pressure-sensitive adhesive composition of the present invention contains a rubber component containing a butyl rubber and a polyisobutylene at a specific mixing proportion and a softener having a kinetic viscosity in a specific range at a specific mixing proportion, so that the pressure-sensitive adhesive composition has excellent pressure-sensitive adhesive properties in a wide temperature range and excellent holding properties with respect to an adherend (an object to be applied) at a high temperature.

Thus, the pressure-sensitive adhesive sheet including the pressure-sensitive adhesive layer that is formed from the above-described pressure-sensitive adhesive composition is capable of being used as a pressure-sensitive adhesive sheet having excellent pressure-sensitive adhesive properties in a wide temperature range and excellent holding properties with respect to an adherend at a high temperature.

The moisture-permeable waterproof sheet that is attached by the pressure-sensitive adhesive sheet of the present invention is attached to various objects to be applied including outdoor uses such as a construction and engineering work and serves as a moisture-permeable waterproof pressure-sensitive adhesive sheet having excellent pressure-sensitive adhesive properties in a wide temperature range and excellent holding properties with respect to an object to be applied at a high temperature, so that the moisture-permeable waterproof properties are capable of being surely imparted to the object to be applied.

BRIEF DESCRIPTION OF THE DRAWINGS

FIG. 1 shows a sectional view of one embodiment (a substrate-less type) of a pressure-sensitive adhesive sheet including a pressure-sensitive adhesive layer formed from a pressure-sensitive adhesive composition of the present invention.

FIG. 2 shows process drawings for illustrating a method for applying a moisture-permeable waterproof sheet to an object to be applied using the pressure-sensitive adhesive sheet shown in FIG. 1;

FIG. 2 (a) illustrating a step of attaching the pressure-sensitive adhesive sheet to the object to be applied and FIG. 2 (b) illustrating a step of applying the moisture-permeable waterproof sheet to the object to be applied via the pressure-sensitive adhesive sheet.

FIG. 5 shows a front view for illustrating a measurement method of a holding force in Examples.

EMBODIMENT OF THE INVENTION

Figure 3:
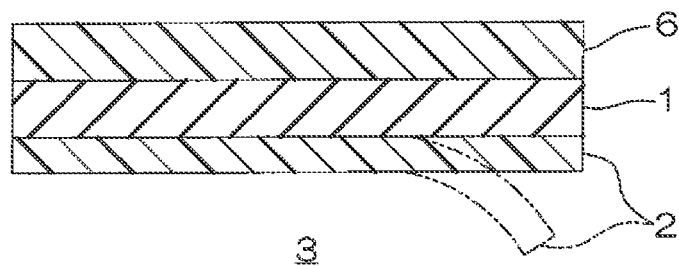
FIG. 3 shows a sectional view of another embodiment (a substrate-including one-sided pressure-sensitive adhesive layer type) of a pressure-sensitive adhesive sheet of the present invention.

A pressure-sensitive adhesive composition of the present invention contains a rubber component and a softener.

The rubber component is blended so as to impart sealing properties to the pressure-sensitive adhesive composition and contains, as an essential rubber, a butyl rubber and a polyisobutylene.

The butyl rubber is a copolymer (an isobutylene and isoprene rubber) of isobutene (isobutylene) and a small amount of isoprene.

A type of the butyl rubber is not particularly limited and examples of the butyl rubber include a reclaimed butyl rubber and a synthetic butyl rubber.

The same type of the butyl rubber can be used alone or different types of the butyl rubbers can be used in combination.

As the butyl rubber, preferably, in view of processability, a reclaimed butyl rubber is used.

The butyl rubber has a Mooney viscosity of; for example, 20 to 100 ($ML_{1+4}$, 100° C.), or preferably, 30 to 60 ($ML_{1+4}$, 100° C.).

The mixing ratio of the butyl rubber with respect to the rubber component is, for example, 40 to 93 mass %, preferably 60 to 90 mass %, or more preferably 70 to 85 mass %.

When the mixing proportion of the butyl rubber is within the above-described range, a reduction in the pressure-sensitive adhesive properties in a wide temperature range, among all, at a high temperature is capable of being effectively prevented.

The polyisobutylene is a polymer of isobutylene and has a viscosity average molecular weight of, for example, 500000 to 3000000, or preferably 1000000 to 2800000. The viscosity average molecular weight of the polyisobutylene is measured in accordance with a method described in Page 2 of a catalogue: "Oppenol B Types" (in 2005 edition) of BASF Japan Ltd.

When the viscosity average molecular weight of the polyisobutylene is within the above-described range, a cohesive force of the pressure-sensitive adhesive composition is capable of being improved.

The same type of the polyisobutylene can be used alone or different types of the polyisobutylenes can be used in combination.

The mixing ratio of the polyisobutylene with respect to the rubber component is, for example, 7 to 60 mass %, preferably 10 to 40 mass %, or more preferably 15 to 30 mass %. When the mixing proportion of the polyisobutylene is within the above-described range, a reduction in the pressure-sensitive adhesive properties in a wide temperature range, among all, at a high temperature is capable of being effectively prevented.

The mixing ratio (the butyl rubber/the polyisobutylene) of the butyl rubber to the polyisobutylene, based on mass, is, for example, 40/60 to 93/7, preferably 60/40 to 90/10, or more preferably 70/30 to 85/15.

In addition to the above-described essential rubber, an arbitrary rubber can be also contained in the rubber component. Examples of the arbitrary rubber include an acrylic rubber, a silicone rubber, a urethane rubber, a vinyl alkyl ether rubber, a polyvinyl alcohol rubber, a polyvinyl pyrrolidone rubber, a polyacrylamide rubber, a cellulose rubber, a natural rubber, a butadiene rubber, a chloroprene rubber, a styrene-butadiene rubber, an acrylonitrile-butadiene rubber, a styrene-ethylene-butadiene-styrene rubber, a styrene-isoprene-styrene rubber, an isoprene rubber, a styrene-butadiene-styrene rubber and an ethylene-propylene rubber. These arbitrary rubbers can be used alone or in combination. The arbitrary rubber can be contained in the rubber component at an appropriate proportion.

The mixing ratio of the rubber component with respect to the pressure-sensitive adhesive composition is, for example, 10 to 50 mass %, or preferably 15 to 45 mass %.

The softener is blended so as to impart excellent pressure-sensitive adhesive properties to the pressure-sensitive adhesive composition in a wide temperature range. Examples of the softener include paraffins, waxes, naphthenes, aromas, asphalts, dry oils (for example, linseed oil), animal and vegetable oils, petroleum oils (for example, process oil), a polybutene, a low molecular weight polyethylene glycol, phthalate esters, phosphate esters, a stearic acid or esters thereof, and alkylsulfonic acid esters.

These softeners can be used alone or in combination of two or more.

As the softener, preferably, petroleum oils and a polybutene are used.

The softener has a kinetic viscosity at 40° C. of, for example, 100 to 9000 mm$^2$/s, preferably 200 to 2000 mm$^2$/s, or more preferably 250 to 1000 mm$^2$/s.

When the kinetic viscosity at 40° C. of the softener is above the above-described upper limit value, the pressure-sensitive adhesive properties at a low temperature may be reduced. On the other hand, when the kinetic viscosity at 40° C. of the softener is below the above-described lower limit value, the holding properties with respect to an adherend (an object to be applied) may be reduced.

The kinetic viscosity of the softener is measured in conformity with JIS K 2283 (in 2000), to be specific, with a glass-made capillary viscosity measuring device. When a plurality of the softeners each having a different kinetic viscosity are used in combination, the kinetic viscosity of the softener is measured as a kinetic viscosity of the mixture.

The softener has a pour point of for example, −55 to −10° C., or preferably −30 to −15° C.

The pour point is the minimum temperature at which a flow state of the softener at the time of being cooled is capable of being retained. The pour point is, for example, measured in conformity with JIS K 2269 (in 1987) with an automatic pour point testing device.

When the pour point of the softener is within the above-described range, the pressure-sensitive adhesive properties at a low temperature are capable of being improved.

The mixing ratio of the softener with respect to 100 parts by mass of the rubber component is, for example, 82 to 128 parts by mass, preferably 90 to 126 parts by mass, or more preferably 95 to 125 parts by mass.

When the mixing proportion of the softener is above the above-described range, the holding properties with respect to an adherend (an object to be applied) may be reduced. On the other hand, when the mixing proportion of the softener is below the above-described range, the pressure-sensitive adhesive properties at a low temperature may be reduced.

A cross-linking agent, a tackifier, and a filler can be also blended in the pressure-sensitive adhesive composition.

An example of the cross-linking agent includes a cross-linking agent that is arbitrarily blended in the pressure-sensitive adhesive composition, is capable of cross-linking at a low temperature, and has a relatively fast cross-linking rate. To be specific, examples of the cross-linking agent include a quinoid compound, a thiuram compound, a quinone dioxime compound, and a maleimide compound.

An example of the quinoid compound includes poly-p-dinitrosobenzene. Examples of the thiuram compound include tetramethyl thiuram disulfide, tetraethyl thiuram disulfide, tetrabutyl thiuram disulfide, tetrakis(2-ethylhcxyl) thiuram disulfide, dipentamethylene thiuram tetrasulfide, and tetramethyl thiuram monosulfide. Examples of the quinone dioxime compound include p-quinone dioxime and p,p'-dibenzoyl quinone dioxime. Examples of the maleimide compound include N,N'-m-phenylene dimaleimide, N,N'-p-phenylene dimaleimide, and N,N'-ethylene dimaleimide.

These cross-linking agents can be used alone or in combination.

As the cross-linking agent, preferably, a quinoid compound is used.

The mixing ratio of the cross-linking agent with respect to 100 parts by mass of the rubber component is, for example, 0.05 to 3 parts by mass, or preferably 0.1 to 2 parts by mass.

When the mixing proportion of the crosslinking agent is within the above-described range, an effect of increasing a cohesive force by cross-linking is capable of being sufficiently achieved.

The tackifier is arbitrarily blended so as to improve a pressure-sensitive adhesive force of the pressure-sensitive adhesive composition and to allow the rubber component to be easily softened at a high temperature. Examples of the tackifier include a petroleum resin, a phenol-based resin, a rosin-based resin, and a terpene-based resin.

These tackifiers can be used alone or in combination.

As the tackifier, preferably, a petroleum resin is used.

The mixing ratio of the tackifier with respect to 100 parts by mass of the rubber component is, for example, 10 to 200 parts by mass, preferably 20 to 150 parts by mass, or more preferably 30 to 70 parts by mass.

The filler is arbitrarily blended so as to reinforce the pressure-sensitive adhesive composition. Examples of the filler include calcium carbonate (for example, heavy calcium carbonate or light calcium carbonate), talc, titanium oxide, carbon black, silica, and magnesium oxide.

The filler has an average particle size of, for example, 0.001 to 10 μm. The amount of a residue on a 350 mesh sieve measured in conformity with JIS K 5101 is, for example, 10 mass % or less, preferably 5 mass % or less, and is, for example, 0.1 mass % or more.

These fillers can be used alone or in combination.

As the filler, preferably, calcium carbonate and talc are used.

The mixing ratio of the filler with respect to 100 parts by mass of the rubber component is, for example, 400 parts by mass or less, preferably 50 to 300 parts by mass, or more preferably 150 to 280 parts by mass.

Furthermore, an additive such as an oxidation inhibitor and a plasticizer can be also blended in the pressure-sensitive adhesive composition at an appropriate proportion as required.

The above-described components are blended at the above-described proportion to be heated and kneaded, so that the pressure-sensitive adhesive composition is capable of being obtained as a kneaded material.

In the kneading, for example, a batch-type kneader such as a kneader, a Banbury mixer, and a mixing roller and a continuous kneader such as a biaxial kneader are used. The heating temperature in the kneading is, for example, 80 to 130° C., or preferably 90 to 125° C.

FIG. 1 shows a sectional view of one embodiment (a substrate-less type) of a pressure-sensitive adhesive sheet including a pressure-sensitive adhesive layer formed from a pressure-sensitive adhesive composition of the present invention. FIG. 2 shows process drawings for illustrating a method for applying a moisture-permeable waterproof sheet to an object to be applied using the pressure-sensitive adhesive sheet shown in FIG. 1: FIG. 2 (a) illustrating a step of attaching the pressure-sensitive adhesive sheet to the object to be applied and FIG. 2 (b) illustrating a step of applying the moisture-permeable waterproof sheet to the object to be applied via the pressure-sensitive adhesive sheet.

Next, one embodiment of a pressure-sensitive adhesive sheet (a substrate-less type) including a pressure-sensitive adhesive layer that is formed from the pressure-sensitive adhesive composition of the present invention and a moisture-permeable waterproof pressure-sensitive adhesive sheet including the pressure-sensitive adhesive sheet is described with reference to FIGS. 1 and 2.

The pressure-sensitive adhesive composition obtained in the description above is heated to be formed into, for example, a sheet (a layer) shape with a forming device such as an extruder, a calendar roller, and a pressing machine (a hot pressing machine), so that a pressures-sensitive adhesive sheet 3 including a pressure-sensitive adhesive layer 1 is fabricated.

Or, as shown in FIG. 1, in the forming device, by sandwiching the pressure-sensitive adhesive composition in a thickness direction between two pieces of release sheets 2, the pressure-sensitive adhesive sheet 3 including the pressure-sensitive adhesive layer 1 and the two pieces of the release sheets 2 that sandwich the pressure-sensitive adhesive layer 1 in the thickness direction therebetween is fabricated. The pressure-sensitive adhesive layer 1 is laminated on the inner-side surfaces of the release sheets 2.

An example of the release sheet 2 includes a release liner (not shown) including a substrate for a release liner (not shown) and a release treated layer that is formed on at least one surface thereof.

Examples of the substrate for a release liner include a plastic substrate sheet (a synthetic resin sheet) such as a polyester sheet (a polyethylene terephthalate (PET) sheet and the like), an olefin resin sheet (a polyethylene sheet, a polypropylene sheet, and the like), a polyvinyl chloride sheet, a polyimide sheet, a polyamide sheet (a nylon sheet), and a rayon sheet and papers (wood free paper, Japanese paper, kraft paper, glassine paper, synthetic paper, top-coated paper, and the like). In addition to these, an example thereof includes a multi-layered laminate (for example, a complex having two to three layers) of the above-described components by lamination, co-extrusion, or the like.

The release treated layer is formed by applying a release treating agent to one surface of the substrate for a release liner to be dried. Examples of the release treating agent include a silicone-based release treating agent, a fluorine-based release treating agent, and a long-chain alkyl-based release treating agent. These release treating agents can be used alone or in combination of two or more.

As the release sheet 2, preferably, a release liner including a PET sheet and a release treated layer that is formed on the PET sheet by application of the silicone-based release treating agent is used.

Each of the release sheets 2 has a thickness of, for example, 1 to 1000 µm.

The pressure-sensitive adhesive layer 1 in the pressure-sensitive adhesive sheet 3 has a pressure-sensitive adhesive force (described in detail in Examples) at −10° C. and 60° C. of 3.0 N/25 mm or more, preferably at −10° C. of 3.5 N/25 mm or more, or more preferably at −10° C. of 4 N/25 mm or more.

The pressure-sensitive adhesive sheet 3 has a holding force (described in detail in Examples) with respect to a stainless steel board of as a deviation of a sample 10 (ref: FIG. 5) including the pressure-sensitive adhesive sheet 3, for example, 5 mm or less.

The pressure-sensitive adhesive sheet 3 is attached to various objects to be applied including outdoor uses such as a construction and engineering work and a moisture-permeable waterproof sheet is attached to the pressure-sensitive adhesive sheet 3. That is, the pressure-sensitive adhesive sheet 3 is subjected to a moisture-permeable waterproof treatment with respect to the object to be applied of the moisture-permeable waterproof sheet.

As referred in FIG. 1, for example, one release sheet 2 in the pressure-sensitive adhesive sheet 3 is peeled from the pressure-sensitive adhesive layer 1. In this way, the surface of the pressure-sensitive adhesive layer 1 is exposed.

Thereafter, as referred in FIG. 2 (a), the pressure-sensitive adhesive layer 1 is attached to an object 4 to be applied.

To be specific, the exposed surface of the pressure-sensitive adhesive layer 1 is compressively bonded to the surface of the object 4 to be applied.

The object 4 to be applied is required to have moisture-permeable waterproof properties. Examples thereof include housing materials (for example, circumference end portions around windows, girth portions, roof materials, and walls) and members subjected to uses for a construction and engineering work (for example, penetrating portions and connecting portions).

Thereafter, as shown in FIG. 2 (b), a moisture-permeable waterproof sheet 7 is applied to the object 4 to be applied to which the pressure-sensitive adhesive sheet 3 is attached. That is, after the attachment of the pressure-sensitive adhesive sheet 3 to the object 4 to be applied, the moisture-permeable waterproof sheet 7 is applied from the upper side of the pressure-sensitive adhesive sheet 3 to the object 4 to be applied. That is, the moisture-permeable waterproof sheet 7 is attached to the pressure-sensitive adhesive sheet 3.

The moisture-permeable waterproof sheet 7 is made of a resin sheet in which a plurality of micropores that penetrate therethrough in the thickness direction are formed, a non-woven fabric in which gaps are formed between fibers, or the like. The moisture-permeable waterproof sheet 7 is a sheet that cuts off rain water; while allowing moisture to go through the micropores and the gaps. The moisture-permeable waterproof sheet 7 is not particularly limited as long as it is a sheet having the above-described function. Examples thereof include the sheets illustrated in Japanese Unexamined Patent Publications No. 2006-241769, No. 2004-003225, and No. 2004-002577.

In order to apply the moisture-permeable waterproof sheet 7 to the object 4 to be applied to which the pressure-sensitive adhesive layer 1 is attached, to be specific, first, as shown by an arrow in FIG. 2 (a), the other release sheet 2 is peeled from the pressure-sensitive adhesive layer 1 and the pressure-sensitive adhesive layer 1 is exposed. Subsequently, the moisture-permeable waterproof sheet 7 is attached to the exposed surface of the pressure-sensitive adhesive layer 1.

In this way, the moisture-permeable waterproof sheet 7 is applied (attached) to the object 4 to be applied via the pressure-sensitive adhesive sheet 3 including the pressure-sensitive adhesive layer 1.

The moisture-permeable waterproof sheet 7 and the pressure-sensitive adhesive sheet 3 are defined as a moisture-permeable waterproof pressure-sensitive adhesive sheet 5 that imparts a moisture-permeable waterproof treatment to the object 4 to be applied. That is, the moisture-permeable waterproof pressure-sensitive adhesive sheet 5 is applied to the object 4 to be applied.

The pressure-sensitive adhesive composition of the present invention contains a rubber component containing a butyl rubber and a polyisobutylene at a specific mixing proportion and a softener having a kinetic viscosity in a specific range at a specific mixing proportion, so that the pressure-sensitive adhesive composition has excellent pressure-sensitive adhesive properties in a wide temperature range and excellent holding properties with respect to an adherend (an object to be applied) at a high temperature.

Thus, the pressure-sensitive adhesive sheet 3 including the pressure-sensitive adhesive layer 1 that is formed from the above-described pressure-sensitive adhesive composition is capable of being used as the pressure-sensitive adhesive sheet 3 having excellent pressure-sensitive adhesive properties in a wide temperature range and excellent holding properties with respect to the object to be applied at a high temperature.

The moisture-permeable waterproof sheet 7 that is attached by the above-described pressure-sensitive adhesive sheet 3 is attached to the object 4 to be applied including outdoor uses such as a construction and engineering work and serves as the moisture-permeable waterproof pressure-sensitive adhesive sheet 5 having excellent pressure-sensitive adhesive properties in a wide temperature range and excellent holding properties with respect to an object to be applied at a high temperature, so that the moisture-permeable waterproof properties are capable of being surely imparted to the object 4 to be applied.

Figure 4:
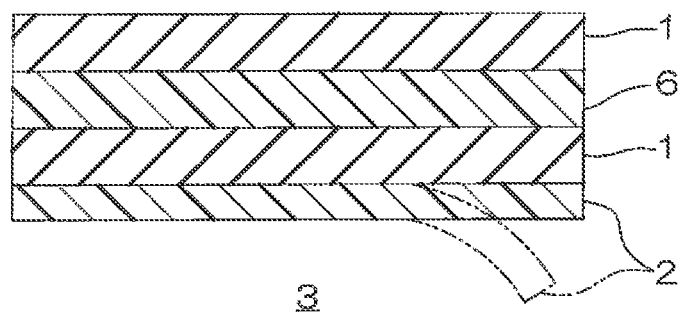
FIG. 4 shows a sectional view of another embodiment (a substrate-including double-sided pressure-sensitive adhesive layer type) of a pressure-sensitive adhesive sheet of the present invention.

FIG. 3 shows a sectional view of another embodiment (a substrate-including one-sided pressure-sensitive adhesive layer type) of a pressure-sensitive adhesive sheet of the present invention. FIG. 4 shows a sectional view of another embodiment (a substrate-including double-sided pressure-sensitive adhesive layer type) of a pressure-sensitive adhesive sheet of the present invention.

In each figure to be described below, the same reference numerals are provided for members corresponding to each of those described above, and their detailed description is omitted.

In the embodiments in FIGS. 1 and 2, the pressure-sensitive adhesive sheet of the present invention is described as the pressure-sensitive adhesive sheet 3 (a substrate-less type pressure-sensitive adhesive sheet 3) including the pressures-sensitive adhesive layer 1 without including a substrate 6 (described later). Alternatively, for example, as shown in FIGS. 3 and 4, the pressure-sensitive adhesive sheet of the present invention can also serve as the pressure-sensitive adhesive sheet 3 (a substrate-including type pressure-sensitive adhesive sheet 3) including the substrate 6.

In FIG. 3, the pressure-sensitive adhesive sheet 3 includes the substrate 6 and the pressure-sensitive adhesive layer 1 that is laminated on the substrate 6.

The pressure-sensitive adhesive layer 1 is laminated on the entire surface (one surface) of the substrate 6.

The substrate 6 is formed into a sheet shape. Examples of the substrate 6 include the same synthetic resin sheet and papers as those illustrated in the release sheet 2. Furthermore, examples of the substrate 6 include a metal foil (for example, a stainless steel foil and an aluminum foil) and cloth (cotton, staple fiber, synthetic fiber, a non-woven fabric, and the like).

As the substrate 6, preferably, a plastic film and cloth are used, or more preferably, a PET sheet and a non-woven fabric are used.

The substrate 6 has a thickness of for example, 20 to 1000 μm, or preferably 50 to 500 μm.

In order to fabricate the pressure-sensitive adhesive sheet 3, the pressure-sensitive adhesive layer 1 is attached to the substrate 6.

As shown in FIG. 3, the release sheet 2 can be also laminated on the back surface (the opposing surface to the laminated side on which the substrate 6 is laminated) of the pressure-sensitive adhesive layer 1.

In order to apply the moisture-permeable waterproof sheet 7 (ref: FIG. 2) to the object 4 to be applied (ref: FIG. 2) using the pressure-sensitive adhesive sheet 3, when the release sheet 2 is laminated, first, as shown by a phantom line in FIG. 3, the release sheet 2 is peeled from the pressure-sensitive adhesive layer 1 and the pressure-sensitive adhesive layer 1 is exposed.

Thereafter, though not shown, a half of the pressure-sensitive adhesive layer 1 is attached to the object 4 to be applied and subsequently, the moisture-permeable waterproof sheet 7 (ref: FIG. 2) is attached to the remaining half of the pressure-sensitive adhesive layer 1.

On the other hand, in FIG. 4, the pressure-sensitive adhesive sheet 3 includes the substrate 6 and the pressure-sensitive adhesive layers 1 that are laminated on both surfaces of the substrate 6.

Two layers of the pressure-sensitive adhesive layers 1 are formed so as to sandwich the substrate 6 in the thickness direction therebetween. Each of the pressure-sensitive adhesive layers 1 has a thickness of, for example, 10 to 1000 μm, or preferably 20 to 800 μm.

Also, the release sheet 2 can be laminated on the surface (the opposing surface to the laminated side on which the substrate 6 is laminated) of one pressure-sensitive adhesive layer 1.

The pressure-sensitive adhesive sheet 3 in FIG. 4 is used for application of a moisture-permeable waterproof treatment of the moisture-permeable waterproof sheet 7 with respect to the object 4 to be applied by the same manner as that in the pressure-sensitive adhesive sheet 3 in FIG. 1.

In the embodiments in FIGS. 3 and 4, the same function and effect as that of the embodiment in FIG. 1 can be achieved. Furthermore, in the embodiments in FIGS. 3 and 4, the strength of the pressure-sensitive adhesive sheet 3 and the moisture-permeable waterproof pressure-sensitive adhesive sheet 5 (ref: FIG. 2 (*b*)) including the pressure-sensitive adhesive sheet 3 and the moisture-permeable waterproof sheet 7 can be also improved by the substrate 6.

The pressure-sensitive adhesive sheet of the present invention includes, for example, a pressure-sensitive adhesive tape and a pressure-sensitive adhesive film.

EXAMPLES

The present invention will now be described in more detail by way of Examples and Comparative Examples. However, the present invention is not limited to the following Examples and Comparative Examples.

(Fabrication of Pressure-Sensitive Adhesive Sheet)

Components were kneaded in conformity with the mixing formulation in Tables 1 and 2 with a mixing roll at 120° C. with the number of revolutions of 15 $min^{-1}$ for 10 minutes, so that a kneaded material was prepared. Thereafter, the prepared kneaded material was sandwiched between two pieces of release liners (release sheets), each of which was made of PET and was subjected to treatment by applying a silicone-based release treating agent to the surface (the inner-side surface) thereof, and was pressed at 80° C. and a pressure of 50 kg/$cm^2$ for five minutes, so that a pressure-sensitive adhesive sheet including a pressure-sensitive adhesive layer having a thickness of 0.5 mm and the two pieces of the release liners was fabricated (ref FIG. 1).

TABLE 1

| Examples | | | Ex. 1 | Ex. 2 | Ex. 3 | Ex. 4 | Ex. 5 | Ex. 6 |
|---|---|---|---|---|---|---|---|---|
| Mixing Formulation of Pressure-Sensitive Adhesive Composition (parts by mass) | Rubber Component | Reclaimed Butyl Rubber | 50 | 80 | 90 | 90 | 85 | 85 |
| | | Oppanol B 100 | 50 | 20 | 10 | — | 15 | 15 |
| | | Oppanol B 150 | — | — | — | 10 | — | — |
| | Tackifier | Escorez 1202 | 50 | 50 | 50 | 50 | 50 | 50 |
| | Softener | Polybutene HV-15 | 100 | 100 | 100 | 100 | 100 | 110 |
| | | Polybutene HV-300 | — | — | — | — | — | — |
| | | Polybutene HV-100 | — | — | — | — | — | — |
| | | Polybutene LV-50 | — | — | — | — | — | — |
| | | PW-90 | — | — | — | — | — | — |
| | | Kinetic Viscosity of Softener (40° C., mm$^2$/s) | 655 | 655 | 655 | 655 | 655 | 655 |
| | | Pour Point of Softener (° C.) | −20 | −20 | −20 | −20 | −20 | −20 |
| | Filler | Heavy Calcium Carbonate | 200 | 200 | 200 | 150 | 200 | 200 |
| | | Imported Talc | — | — | — | 50 | — | — |
| | Cross-Linking Agent | VULNOC DNB | — | — | — | — | — | — |
| Evaluation | Pressure-Sensitive Adhesive Force [N/25 mm] | −10° C. | 4.1 | 3.3 | 6.5 | 3.8 | 4.0 | 5.0 |
| | | 60° C. | 4.2 | 6.0 | 4.5 | 5.0 | 3.0 | 3.5 |
| | Holding Force | 60° C. × 5 min, 200 g | Good | Good | Good | Good | Good | Good |

| Examples | | | Ex. 7 | Ex. 8 | Ex. 9 | Ex. 10 | Ex. 11 | Ex. 12 |
|---|---|---|---|---|---|---|---|---|
| Mixing Formulation of Pressure-Sensitive Adhesive Composition (parts by mass) | Rubber Component | Reclaimed Butyl Rubber | 85 | 85 | 85 | 85 | 85 | 85 |
| | | Oppanol B 100 | 15 | 15 | 15 | 15 | 15 | 15 |
| | | Oppanol B 150 | — | — | — | — | — | — |
| | Tackifier | Escorez 1202 | 50 | 50 | 50 | 50 | 50 | 50 |
| | Softener | Polybutene HV-15 | 120 | 125 | 115 | 115 | 115 | 115 |
| | | Polybutene HV-300 | — | — | — | — | — | — |
| | | Polybutene HV-100 | — | — | — | — | — | — |
| | | Polybutene LV-50 | — | — | — | — | — | — |
| | | PW-90 | — | — | — | — | — | — |
| | | Kinetic Viscosity of Softener (40° C., mm$^2$/s) | 655 | 655 | 655 | 655 | 655 | 655 |
| | | Pour Point of Softener (° C.) | −20 | −20 | −20 | −20 | −20 | −20 |
| | Filler | Heavy Calcium Carbonate | 200 | 200 | 250 | 250 | 250 | 250 |
| | | Imported Talc | — | — | — | — | — | — |
| | Cross-Linking Agent | VULNOC DNB | — | — | 0.1 | 0.25 | 0.5 | 0.75 |
| Evaluation | Pressure-Sensitive Adhesive Force [N/25 mm] | −10° C. | 7.0 | 8.0 | 6.5 | 6.0 | 6.0 | 6.0 |
| | | 60° C. | 3.0 | 3.0 | 3.0 | 3.0 | 3.5 | 3.5 |
| | Holding Force | 60° C. × 5 min, 200 g | Good | Good | Good | Good | Good | Good |

TABLE 2

| Examples · Comparative Examples | | | Ex.13 | Ex. 14 | Ex.15 | Ex. 16 | Ex. 17 | Ex 18 | Comp. Ex. 1 |
|---|---|---|---|---|---|---|---|---|---|
| Mixing Formulation of Pressure-Sensitive Adhesive Composition (parts by mass) | Rubber Component | Reclaimed Butyl Rubber | 85 | 85 | 90 | 90 | 90 | 90 | 95 |
| | | Oppanol B 100 | 15 | 15 | 10 | 10 | 10 | 10 | 5 |
| | | Oppanol B 150 | — | — | — | — | — | — | — |
| | Tackifier | Escorez 1202 | 50 | 50 | 50 | 50 | 50 | 50 | 50 |
| | Softener | Polybutene HV-15 | 115 | 115 | 50 | 75 | 50 | — | 100 |
| | | Polybutene HV-300 | — | — | 50 | 25 | — | — | — |
| | | Polybutene HV-100 | — | — | — | — | — | — | — |
| | | Polybutene LV-50 | — | — | — | — | 50 | 100 | — |
| | | PW-90 | — | — | — | — | — | — | — |
| | | Kinetic Viscosity of Softener (40° C., mm$^2$/s) | 655 | 655 | 3000 | 1500 | 300 | 110 | 655 |
| | | Pour Point of Softener (° C.) | −20 | −20 | ND*[1] | ND*[1] | ND*[1] | −35 | −20 |
| | Filler | Heavy Calcium Carbonate | 250 | 250 | 200 | 200 | 200 | 200 | 200 |
| | | Imported Talc | — | — | — | — | — | — | — |
| | Cross-Linking Agent | VULNOC DNB | 1 | 2 | — | — | — | — | — |
| Evaluation | Pressure-Sensitive Adhesive Force [N/25 mm] | −10° C. | 6.0 | 5.0 | 3.0 | 5.0 | 5.0 | 7.0 | 3.9 |
| | | 60° C. | 3.5 | 3.5 | 6.4 | 5.0 | 4.2 | 3.0 | 2.6 |
| | Holding Force | 60° C. × 5 min, 200 g | Good | Good | Good | Good | Good | Good | Bad |

TABLE 2-continued

| Examples · Comparative Examples | | | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Mixing Formulation of Pressure-Sensitive Adhesive Composition (parts by mass) | Rubber Component | Reclaimed Butyl Rubber | 90 | 85 | 85 | 90 | 90 | 90 |
| | | Oppanol B 100 | 10 | 15 | 15 | 10 | 10 | 10 |
| | | Oppanol B 150 | — | — | — | — | — | — |
| | Tackifier | Escorez 1202 | 50 | 50 | 50 | 50 | 50 | 50 |
| | Softner | Polybutene HV-15 | 140 | 80 | 130 | — | — | — |
| | | Polybutene HV-300 | — | — | — | 100 | — | — |
| | | Polybutene HV-100 | — | — | — | — | 100 | — |
| | | Polybutene LV-50 | — | — | — | — | — | — |
| | | PW-90 | — | — | — | — | — | 100 |
| | | Kinetic Viscosity of Softner (40° C., mm²/s) | 655 | 655 | 655 | 26000 | 9500 | 96 |
| | | Pour Point of Softner (° C.) | −20 | −20 | −20 | 0 | −7.5 | −15 |
| | Filler | Heavy Calcium Carbonate | 150 | 200 | 200 | 200 | 200 | 200 |
| | | Imported Talc | 50 | — | — | — | — | — |
| Evaluation | Cross-Linking Agent | VULNOC DNB | — | — | — | — | — | — |
| | Pressure-Sensitive Adhesive Force [N25 mm] | −10° C. | 80 | 1.0 | 8.0 | 2.1 | 1.7 | 7.6 |
| | | 60° C. | 1.5 | 6.6 | 2.5 | 5.7 | 4.8 | 2.3 |
| | Holding Force | 60° C. × 5 min, 200 g | Bad | Good | Bad | Good | Bad | Bad |

*[1] unmeasurable

In Tables, values in the rows of mixing formulation represent the number of blended parts by mass of the components, unless otherwise specified.

The details of the abbreviations in Tables are shown in the following.

Reclaimed Butyl Rubber: a Mooney viscosity (ML1+4 (at 100° C.)) of 44±6

Oppanol B 100: a polyisobutylene, a viscosity average molecular weight of 1100000, manufactured by BASF Japan Ltd.

Oppanol B 150: a polyisobutylene, a viscosity average molecular weight of 2600000, manufactured by BASF Japan Ltd.

Escorez 1202: a tackifier, a petroleum resin, manufactured by Exxon Mobil Corporation Polybutene HV-300: a polybutene, a softener, a pour point of 0° C., a kinetic viscosity (at 40° C.) of 26000 mm²/s, manufactured by JX Nippon Oil & Energy Corporation Polybutene HV-100: a polybutene, a softener, a pour point of −7.5° C., a kinetic viscosity (at 40° C.) of 9500 mm²/s, manufactured by JX Nippon Oil & Energy Corporation Polybutene LV-50: a polybutene, a softener, a pour point of −35° C., a kinetic viscosity (at 40° C.) of 110 mm²/s, manufactured by JX Nippon Oil & Energy Corporation PW-90: trade name: "Diana Process Oil PW-90", a softener, a process oil, a pour point of −15° C., a kinetic viscosity (at 40° C.) of 96 mm²/s, manufactured by Idemitsu Kosan Co., Ltd.

Heavy Calcium Carbonate: a filler, an amount of a residue on a sieve (350 mesh): 0.5% or less (in conformity with JIS K5101), manufactured by MARUO CALCIUM CO., LTD.

Imported Talc: a filler, an amount of a residue on a sieve (350 mesh): 1% or less (in conformity with JIS K5101), manufactured by SOBUE CLAY Co., Ltd.

VULNOC DNB: a cross-linking agent, poly-p-dinitrosobenzene, a quinoid compound, manufactured by OUCHI SHINKO CHEMICAL INDUSTRIAL CO., LTD.

(Evaluation)

1. Pressure-Sensitive Adhesive Force 1-1. Pressure-Sensitive Adhesive Force at 60° C.

One release liner in each of the pressure-sensitive adhesive sheets in Examples and Comparative Examples was peeled from the pressure-sensitive adhesive layer (ref: a phantom line in FIG. 1) and the exposed pressure-sensitive adhesive layer was attached to a PET sheet having a thickness of 25 μm and each of samples was fabricated. The pressure-sensitive adhesive force of each of the samples was measured in conformity with JTC S-0003 of JTC standard (standard of Japan Exterior Furnishing Technical Center).

That is, the sample was cut into pieces each having a width of 25 mm and a length of 250 mm to obtain each of evaluation samples. The other release liner of the evaluation sample was peeled from the pressure-sensitive adhesive layer and the exposed pressure-sensitive adhesive layer was attached to a stainless steel board (manufactured by SUS 304). Thereafter, the evaluation sample was compressively bonded to the stainless steel board by one reciprocation of a 2 kg roller.

Thereafter, after the evaluation sample was allowed to stand at 60° C. for one hour, the pressure-sensitive adhesive force at 60° C. of the evaluation sample with respect to the stainless steel board was measured at the temperature, a peeling angle of 180 degrees, and a peeling rate of 300 mm/min.

1-2. Pressure-Sensitive Adhesive Force at −10° C.

The pressure-sensitive adhesive force at −10° C. of the sample with respect to the stainless steel board was measured in the same manner as that in the above-described "1.1", except that the temperature during the standing was changed from 60° C. to −10° C.

2. Holding Force

One release liner in each of the pressure-sensitive adhesive sheets in Examples and Comparative Examples was peeled from the pressure-sensitive adhesive layer (ref the phantom line in FIG. 1) and the exposed pressure-sensitive adhesive layer was attached to a PET sheet having a thickness of 25 μm and each of samples was fabricated. The holding force of each of the samples was measured in conformity with JTC S-0003 of TC standard.

That is, first, as shown in FIG. 5, a sample (10) was cut into pieces each having a width of 25 mm and a length of 150 mm to obtain each of evaluation samples (10).

Separately, a stainless steel board (manufactured by SUS 304) (6) that was cut into a piece having a width of 50 mm and a length of 125 mm was prepared. A circular hole penetrating in the thickness direction was formed in one end portion in a longitudinal direction of the stainless steel board (6).

Next, the other release liner (2) in the evaluation sample (10) was peeled from a pressure-sensitive adhesive layer (1) and one end portion in the longitudinal direction (a length of 25 mm) of the exposed pressure-sensitive adhesive layer (1) in the evaluation sample (10) was attached (an attachment size of 25 mm×25 mm) to the central portion in a widthwise direction of the other end portion in the longitudinal direction (a length of 25 mm) of the stainless steel board (6). Thereafter, the evaluation sample (10) was compressively bonded to the stainless steel board (6) by one reciprocation of a 2 kg roller.

Thereafter, after the evaluation sample (10) was allowed to stand at 60° C. for one hour, the circular hole of the stainless steel board (6) was fixed and then, a weight of 200 g was put at the other end portion in the longitudinal direction of the evaluation sample (10). Then, the evaluation sample (10) was suspended in a direction shown by an arrow. After five minutes of the suspension, a distance of a downward deviation of the evaluation sample (10) with respect to the stainless steel board (6) was measured and the holding force was evaluated in conformity with the evaluation criteria shown in the following.

Good: deviation was 5 mm or less.

Bad: deviation was above 5 mm.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The moisture-permeable waterproof sheet including the pressure-sensitive adhesive layer that is formed from the pressure-sensitive adhesive composition is applied to a member that requires the moisture-permeable waterproof properties.

The invention claimed is:

1. A pressure-sensitive adhesive composition comprising:
   100 parts by mass of a rubber component containing 40 to 93 mass % of a butyl rubber and 7 to 60 mass % of a polyisobutylene; and
   82 to 128 parts by mass of a softener having a kinetic viscosity at 40° C. of 100 to 9,000 mm$^2$/s,
   wherein a pressure-sensitive adhesive layer formed from the pressure-sensitive adhesive composition has a pressure-sensitive adhesive force of 3.0 N/25 mm or more in a temperature range of −10° C. to 60° C.

2. The pressure-sensitive adhesive composition according to claim 1, wherein the softener has a pour point of −55 to −10° C.

3. The pressure-sensitive adhesive composition according to claim 1, wherein the polyisobutylene has a viscosity average molecular weight of 500,000 to 3,000,000.

4. The pressure-sensitive adhesive composition according to claim 1, wherein the butyl rubber is a reclaimed butyl rubber.

5. The pressure-sensitive adhesive composition according to claim 1, wherein the pressure-sensitive adhesive composition further contains a cross-linking agent.

6. The pressure-sensitive adhesive composition according to claim 1, wherein the softener is polybutene.

7. A pressure-sensitive adhesive sheet comprising:
   a pressure-sensitive adhesive layer formed from a pressure-sensitive adhesive composition containing:
   100 parts by mass of a rubber component containing 40 to 93 mass % of a butyl rubber and 7 to 60 mass % of a polyisobutylene; and
   82 to 128 parts by mass of a softener having a kinetic viscosity at 40° C. of 100 to 9,000 mm$^2$/s,
   wherein the pressure-sensitive adhesive layer has a pressure-sensitive adhesive force of 3.0 N/25 mm or more in a temperature range of −10° C. to 60° C.

8. A moisture-permeable waterproof pressure-sensitive adhesive sheet comprising:
   a moisture-permeable waterproof sheet; and
   a pressure-sensitive adhesive sheet laminated on the moisture-permeable waterproof sheet, wherein
   the pressure-sensitive adhesive sheet includes a pressure-sensitive adhesive layer formed from a pressure-sensitive adhesive composition containing:
   100 parts by mass of a rubber component containing 40 to 93 mass % of a butyl rubber and 7 to 60 mass % of a polyisobutylene; and
   82 to 128 parts by mass of a softener having a kinetic viscosity at 40° C. of 100 to 9,000 mm$^2$/s,
   wherein the pressure-sensitive adhesive layer has a pressure-sensitive adhesive force of 3.0 N/25 mm or more in a temperature range of −10° C. to 60° C.

\* \* \* \* \*